(12) United States Patent
Kirigan et al.

(10) Patent No.: US 11,816,900 B2
(45) Date of Patent: Nov. 14, 2023

(54) APPROACHES FOR ENCODING ENVIRONMENTAL INFORMATION

(71) Applicant: Lyft, Inc., San Francisco, CA (US)

(72) Inventors: Ivan Kirigan, Redwood City, CA (US); David Tse-Zhou Lu, Menlo Park, CA (US); Sheng Yang, Palo Alto, CA (US); Ranjith Unnikrishnan, Fremont, CA (US); Emilie Jeanne Anne Danna, Sunnyvale, CA (US); Weiyi Hou, Mountain View, CA (US); Daxiao Liu, Sunnyvale, CA (US); Suneet Rajendra Shah, San Francisco, CA (US); Ying Liu, Los Altos, CA (US)

(73) Assignee: Lyft, Inc., San Francisco, CA (US)

( * ) Notice: Subject to any disclaimer, the term of this patent is extended or adjusted under 35 U.S.C. 154(b) by 852 days.

(21) Appl. No.: 16/661,402

(22) Filed: Oct. 23, 2019

(65) Prior Publication Data

US 2021/0124350 A1   Apr. 29, 2021

(51) Int. Cl.
*G01C 22/00*       (2006.01)
*G06V 20/56*       (2022.01)
(Continued)

(52) U.S. Cl.
CPC .......... *G06V 20/56* (2022.01); *G05D 1/0088* (2013.01); *G06V 10/762* (2022.01); *G06V 20/58* (2022.01); *G05D 2201/0213* (2013.01)

(58) Field of Classification Search
CPC ......... G05D 1/0088; G05D 2201/0213; G05D 2201/02; G05D 1/021
(Continued)

(56) References Cited

U.S. PATENT DOCUMENTS 7,680,749 B1   3/2010  Golding et al.
8,489,316 B1   7/2013  Hedges
(Continued)

FOREIGN PATENT DOCUMENTS

EP      3342683       7/2018
JP   2010134499 A     6/2010

OTHER PUBLICATIONS

International Patent Application No. PCT/US2020/039444, Search Report and Written Opinion dated Oct. 13, 2020, 10 pages.
(Continued)

*Primary Examiner* — Hung Q Nguyen
*Assistant Examiner* — Anthony Donald Taylor, Jr.
(74) *Attorney, Agent, or Firm* — Sheppard Mullin Richter & Hampton LLP

(57) ABSTRACT

Systems, methods, and non-transitory computer-readable media can access a plurality of parameter-based encodings providing a structured representation of an environment captured by one or more sensors associated with a plurality of vehicles traveling through the environment. A given parameter-based encoding of the environment identifies one or more agents that were detected by a vehicle within the environment and respective location information for the one or more agents within the environment. The plurality of parameter-based encodings can be clustered into one or more clusters of parameter-based encodings. At least one scenario associated with the environment can be determined based at least in part on the one or more clusters of parameter-based encodings.

20 Claims, 15 Drawing Sheets

(51) Int. Cl.
  *G05D 1/00* (2006.01)
  *G06V 10/762* (2022.01)
  *G06V 20/58* (2022.01)

(58) Field of Classification Search
  USPC .................................. 701/27, 101, 102, 400
  See application file for complete search history.

(56) References Cited

U.S. PATENT DOCUMENTS

| | | |
|---|---|---|
| 9,672,734 B1 | 6/2017 | Ratnasingam |
| 9,881,503 B1 | 1/2018 | Goldman |
| 10,186,156 B2 | 1/2019 | Sweeney |
| 10,338,594 B2 | 7/2019 | Long |
| 10,372,132 B2 | 8/2019 | Herz |
| 10,388,594 B2 | 8/2019 | Long |
| 10,414,395 B1 | 9/2019 | Sapp et al. |
| 10,992,755 B1 | 4/2021 | Tran |
| 11,126,180 B1 | 9/2021 | Kobilarov |
| 11,150,660 B1 | 10/2021 | Kabirzadeh et al. |
| 11,200,429 B1 | 12/2021 | Evans et al. |
| 11,409,304 B1* | 8/2022 | Cai ..................... B60W 60/001 |
| 2003/0131069 A1 | 7/2003 | Lucovsky et al. |
| 2003/0131142 A1 | 7/2003 | Horvitz et al. |
| 2004/0210500 A1 | 10/2004 | Sobel et al. |
| 2005/0044108 A1 | 2/2005 | Shah et al. |
| 2005/0049993 A1 | 3/2005 | Nori et al. |
| 2005/0137769 A1 | 6/2005 | Takamatsu et al. |
| 2006/0036642 A1 | 2/2006 | Horvitz et al. |
| 2008/0071465 A1 | 3/2008 | Chapman et al. |
| 2008/0162498 A1 | 7/2008 | Omoigui |
| 2009/0177685 A1 | 7/2009 | Ellis et al. |
| 2009/0240728 A1 | 9/2009 | Shukla et al. |
| 2010/0017060 A1 | 1/2010 | Zhang |
| 2011/0251735 A1 | 10/2011 | Hayashi |
| 2012/0078595 A1 | 3/2012 | Balandin et al. |
| 2012/0078905 A1 | 3/2012 | Lin et al. |
| 2012/0191716 A1 | 7/2012 | Omoigui |
| 2012/0209505 A1 | 8/2012 | Breed et al. |
| 2012/0259732 A1 | 10/2012 | Sasankan et al. |
| 2012/0330540 A1 | 12/2012 | Ozaki et al. |
| 2013/0166205 A1 | 6/2013 | Ikeda et al. |
| 2013/0278442 A1 | 10/2013 | Rubin et al. |
| 2014/0032581 A1 | 1/2014 | Young |
| 2014/0257659 A1* | 9/2014 | Dariush ................. G08G 1/166 701/1 |
| 2015/0269198 A1 | 9/2015 | Cornish et al. |
| 2015/0291146 A1* | 10/2015 | Prakah-Asante ..... B60W 10/22 701/65 |
| 2016/0061625 A1 | 3/2016 | Wang |
| 2016/0171521 A1 | 6/2016 | Ramirez |
| 2016/0223343 A1 | 8/2016 | Averbuch |
| 2016/0275730 A1 | 9/2016 | Bonhomme |
| 2016/0334797 A1 | 11/2016 | Ross |
| 2016/0357788 A1 | 12/2016 | Wilkes et al. |
| 2017/0010107 A1 | 1/2017 | Shashua |
| 2017/0017529 A1 | 1/2017 | Elvanoglu et al. |
| 2017/0089710 A1 | 3/2017 | Slusar |
| 2017/0113685 A1 | 4/2017 | Sendhoff |
| 2017/0132334 A1 | 5/2017 | Levinson et al. |
| 2017/0177937 A1 | 6/2017 | Harmsen |
| 2017/0200063 A1 | 7/2017 | Nariyambut Murali et al. |
| 2017/0241791 A1 | 8/2017 | Madigan |
| 2017/0270372 A1 | 9/2017 | Stein |
| 2017/0286782 A1* | 10/2017 | Pillai ..................... B60W 40/08 |
| 2017/0293763 A1 | 10/2017 | Shear et al. |
| 2018/0005254 A1* | 1/2018 | Bai ........................ B60W 10/00 |
| 2018/0023964 A1* | 1/2018 | Ivanov ..................... G06T 7/12 701/411 |
| 2018/0181095 A1 | 3/2018 | Funk |
| 2018/0136979 A1 | 5/2018 | Morris |
| 2018/0137373 A1 | 5/2018 | Rasusson |
| 2018/0149491 A1* | 5/2018 | Tayama ................. G08G 1/166 |
| 2018/0217600 A1* | 8/2018 | Shashua ............. G01C 21/3602 |
| 2018/0246752 A1 | 8/2018 | Bonetta et al. |
| 2018/0288060 A1 | 10/2018 | Jackson et al. |
| 2018/0316695 A1 | 11/2018 | Esman |
| 2019/0019329 A1 | 1/2019 | Eyler et al. |
| 2019/0042867 A1 | 2/2019 | Chen et al. |
| 2019/0049948 A1 | 2/2019 | Patel et al. |
| 2019/0049968 A1 | 2/2019 | Dean |
| 2019/0108753 A1 | 4/2019 | Kaiser et al. |
| 2019/0143992 A1* | 5/2019 | Sohn .................... G05D 1/0214 701/23 |
| 2019/0171797 A1 | 6/2019 | Morris |
| 2019/0174397 A1 | 6/2019 | Naqvi |
| 2019/0205310 A1 | 7/2019 | Satkunarajah et al. |
| 2019/0243371 A1 | 8/2019 | Nister |
| 2019/0244040 A1 | 8/2019 | Hermann |
| 2019/0256087 A1 | 8/2019 | Kim et al. |
| 2019/0258251 A1 | 8/2019 | Ditty |
| 2019/0258878 A1 | 8/2019 | Koivisto |
| 2019/0266139 A1 | 8/2019 | Kumarasamy et al. |
| 2019/0370615 A1 | 12/2019 | Murphy et al. |
| 2019/0377354 A1 | 12/2019 | Shalev-Shwartz et al. |
| 2020/0013088 A1 | 1/2020 | Naqvi |
| 2020/0019161 A1 | 1/2020 | Stenneth |
| 2020/0042626 A1 | 2/2020 | Curtis et al. |
| 2020/0042651 A1 | 2/2020 | Curtis et al. |
| 2020/0050190 A1 | 2/2020 | Patel et al. |
| 2020/0050483 A1 | 2/2020 | Shear et al. |
| 2020/0081445 A1 | 3/2020 | Stetson et al. |
| 2020/0117200 A1 | 4/2020 | Akella et al. |
| 2020/0151353 A1 | 5/2020 | Struttmann |
| 2020/0180610 A1 | 6/2020 | Schneider et al. |
| 2020/0183794 A1 | 6/2020 | Dwarampudi et al. |
| 2020/0201890 A1 | 6/2020 | Viswanathan |
| 2020/0204534 A1 | 6/2020 | Beecham et al. |
| 2020/0285788 A1 | 9/2020 | Brebner |
| 2020/0351322 A1 | 11/2020 | Magzimof et al. |
| 2020/0394455 A1 | 12/2020 | Lee et al. |
| 2021/0011150 A1 | 1/2021 | Bialer et al. |
| 2021/0021539 A1 | 1/2021 | Shear et al. |
| 2021/0041873 A1 | 2/2021 | Kim et al. |
| 2021/0053561 A1 | 2/2021 | Beller et al. |
| 2021/0055732 A1 | 2/2021 | Caldwell et al. |
| 2021/0097148 A1* | 4/2021 | Bagschik ................ G06F 30/15 |
| 2021/0142526 A1 | 5/2021 | Mantyjarvi et al. |
| 2021/0350147 A1 | 11/2021 | Yuan et al. |
| 2022/0011130 A1 | 1/2022 | Hanniel et al. |
| 2022/0113371 A1 | 4/2022 | Han et al. |
| 2022/0163348 A1 | 5/2022 | Zhang et al. |

OTHER PUBLICATIONS

International Patent Application No. PCT/US2019/045780, Search Report and Written Opinion dated Nov. 27, 2019, 10 pages.

\* cited by examiner

Clustering Parameter-based Encodings to Identify Scenario Families

Histogram of Scenario Families Associated with Environment

520

> Access a plurality of parameter-based encodings providing a structured representation of an environment captured by one or more sensors associated with a plurality of vehicles traveling through the environment, wherein a given parameter-based encoding of the environment identifies one or more agents that were detected by a vehicle within the environment and respective location information for the one or more agents within the environment
> 522

> Cluster the plurality of parameter-based encodings into one or more clusters of parameter-based encodings
> 524

> Determine at least one scenario associated with the environment based at least in part on the one or more clusters of parameter-based encodings
> 526

FIGURE 5B

APPROACHES FOR ENCODING ENVIRONMENTAL INFORMATION

FIELD OF THE INVENTION

The present technology relates to the field of vehicles. More particularly, the present technology relates to systems, apparatus, and methods for interpreting and applying environmental information.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have optical cameras that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to access a plurality of parameter-based encodings providing a structured representation of an environment captured by one or more sensors associated with a plurality of vehicles traveling through the environment. A given parameter-based encoding of the environment identifies one or more agents that were detected by a vehicle within the environment and respective location information for the one or more agents within the environment. The plurality of parameter-based encodings can be clustered into one or more clusters of parameter-based encodings. At least one scenario associated with the environment can be determined based at least in part on the one or more clusters of parameter-based encodings.

In an embodiment, the parameter-based encoding of the environment further includes at least one of: respective motion information for the one or more agents, respective distance information for the one or more agents, and respective time information for the one or more agents.

In an embodiment, clustering the plurality of parameter-based encodings further includes generating respective feature vector representations for each of the plurality of parameter-based encodings and clustering the feature vector representations based on similarity to determine the one or more clusters of parameter-based encodings.

In an embodiment, a feature vector representation includes two or more features corresponding to location information for the one or more agents, motion information for the one or more agents, distance information for the one or more agents, time information for the one or more agents, or a combination thereof.

In an embodiment, the location information provides a geometric location for an agent with respect to a geometric map of the environment, a semantic location for the agent with respect to a semantic map of the environment, or both.

In an embodiment, the motion information provides a position, direction of travel, orientation, velocity, acceleration, and jerk for an agent in absolute or relative terms.

In an embodiment, the distance information for an agent includes relative distances between one or more other agents in the environment or one or more road features in the environment.

In an embodiment, the time information for an agent includes an amount of time for the agent to reach another agent in the environment or a road feature in the environment.

In an embodiment, the systems, methods, and non-transitory computer readable media are configured to perform determining a first sub-cluster and a second sub-cluster from a given cluster associated with a given scenario; determining the first sub-cluster of parameter-based encodings represent a first sub-scenario; or determining the second sub-cluster of parameter-based encodings represent a second sub-scenario.

In an embodiment, the systems, methods, and non-transitory computer readable media are configured to perform associating parameter-based encodings included in the first sub-cluster with a first vehicle maneuver to be performed autonomously or semi-autonomously; or associating parameter-based encodings included in the second sub-cluster with a second vehicle maneuver to be performed autonomously or semi-autonomously.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 5A-5B illustrate example methods, according to an embodiment of the present technology.

Figure 1A:
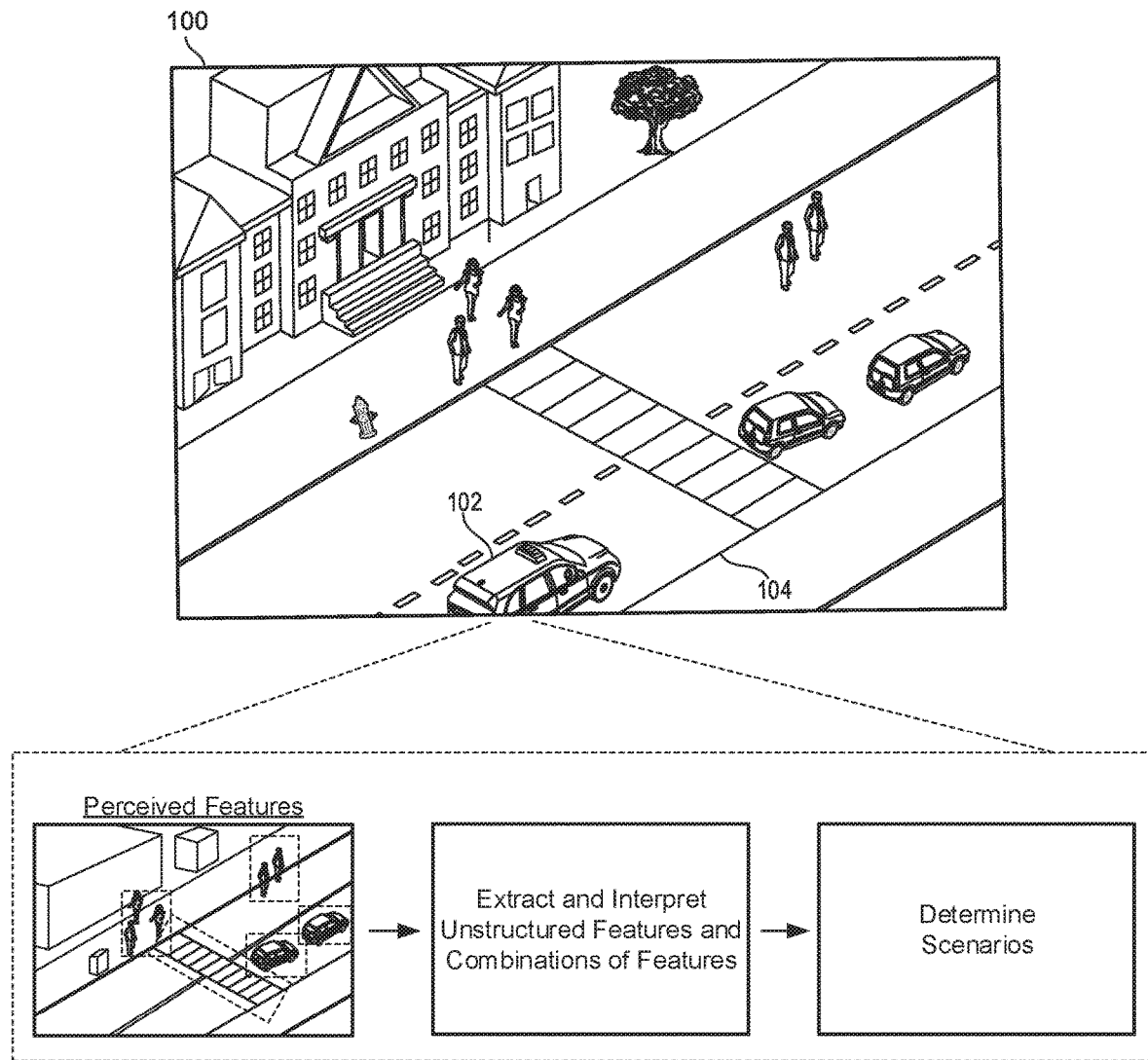
FIGS. 1A-1B illustrate challenges that may be experienced by a vehicle when interpreting and applying environmental information and improvements thereof, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. For example, a vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, an autonomous vehicle may have optical cameras for recognizing hazards, roads, lane markings, traffic signals, and the like. Data from sensors may be used to, for example, safely drive the vehicle, activate certain safety features (e.g., automatic braking), and generate alerts about potential hazards. In some instances, such vehicles may be used by a transportation management system to provide ride services or other types of services. A transportation management system may comprise a fleet of such vehicles. Each vehicle in the fleet may include one or more sensors in a sensor suite. In general, a vehicle can traverse a geographic location or region using a number of different routes. Each route can be made up of one or more road segments. Further, each road segment can be associated with a number of scenarios that may be encountered by vehicles while driving on those road segments. For instance, a road segment in a mountainous terrain may be associated with a "fallen debris" scenario. In another example, a road segment near a school may be associated with a "schoolchildren" scenario. Such scenarios can be taken into consideration when routing vehicles to reduce risk and improve safety, for example, by either avoiding road segments that pose a high level of risk of encountering certain types of objects (e.g., animals, debris, etc.) or by modifying operation of the vehicles when navigating high risk road segments (e.g., reducing speed, increasing distance between objects, etc.). Under conventional approaches, scenarios for a given environment can be determined by collecting sensor data for the environment, for example, by a fleet of vehicles that include sensor suites. The sensor data can be analyzed to determine (or predict) scenarios for the environment. For example, the sensor data can be analyzed to determine features, such as static and dynamic objects present within the environment, locations of the static and dynamic objects within the environment, and contextual information describing the environment (e.g., time of day, weather conditions, etc.). These unstructured features can be interpreted individually or in various combinations to recognize predefined scenarios. For instance, a model may be trained to interpret features and combinations of features for purposes of recognizing scenarios. However, the capabilities of such models can be limited due to the high dimensionality of feature data from which the models are expected to learn to recognize scenarios. For example, FIG. 1A illustrates an example environment 100 in which a vehicle 102 is shown navigating a road 104. In general, the vehicle 102 may be equipped with one or more sensors that can be used to capture environmental information, such as information describing a given road and objects present on or along the road. For example, in some instances, the vehicle 102 may be equipped with one or more sensors in a sensor suite including optical cameras, LiDAR, radar, infrared cameras, and ultrasound equipment, to name some examples. Such sensors can be used to collect information that can be used by the vehicle 102 to understand its environment and objects within the environment. Under conventional approaches, the vehicle 102 can perceive and interpret detected features and combinations of features, such as static objects (e.g., building, trees, fire hydrant, crosswalk) and dynamic objects (e.g., pedestrians, vehicles, etc.) that were detected by the vehicle 102 within the environment 100. The relationships between such features and combinations of features thereafter can be processed to determine and log scenarios encountered by the vehicle 102. However, such existing approaches interpret and apply environmental information in an unstructured manner which may result in undesired consequences, such as inaccurate classification of scenarios and scenario families. Accordingly, other robust approaches are needed to more accurately and reliably interpret and apply environmental information to improve scenario classification and enable other applications.

Figure 1B:
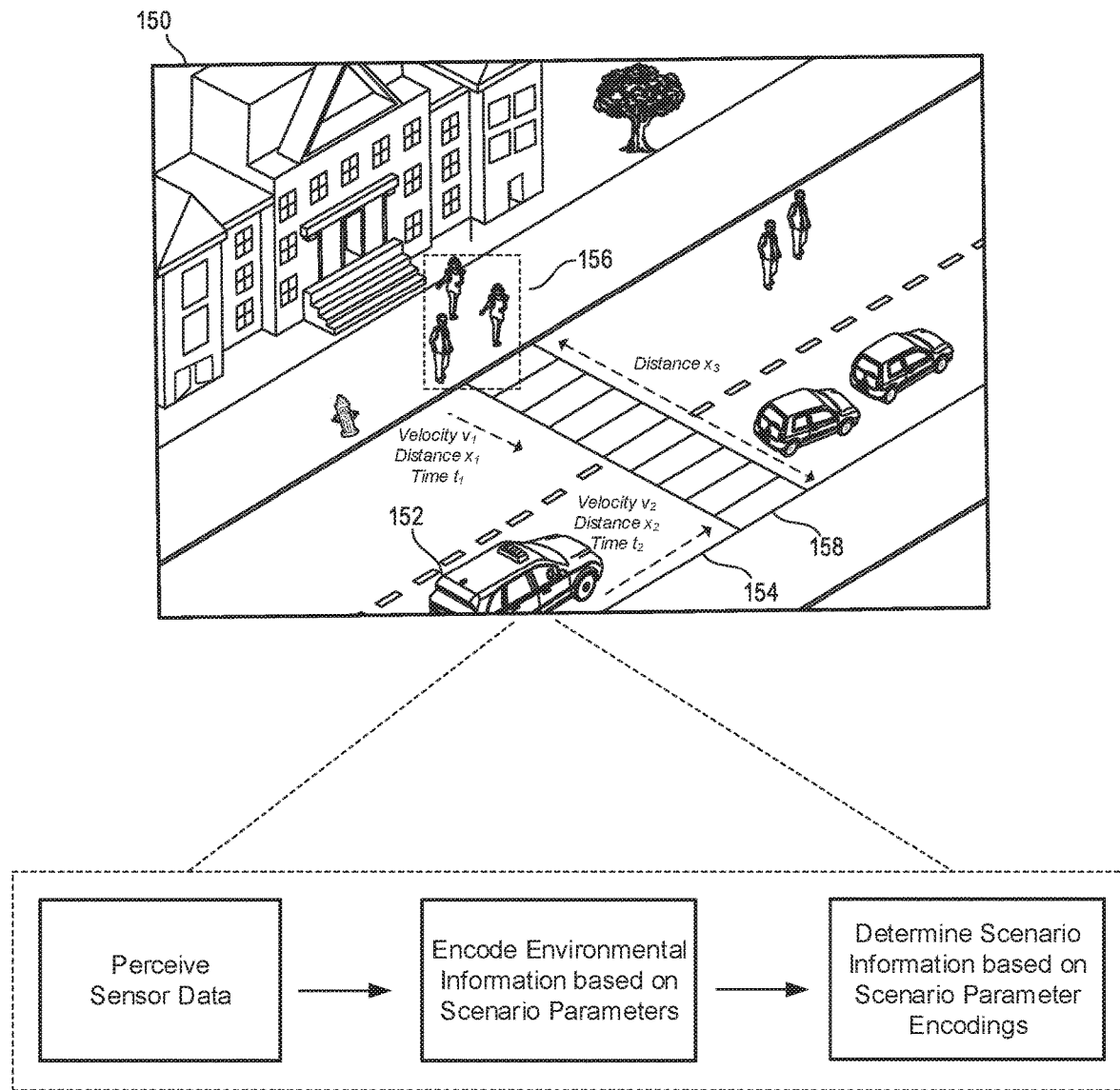

An improved approach in accordance with the present technology overcomes the foregoing and other disadvantages associated with conventional approaches. In various embodiments, environmental information perceived by a vehicle can be interpreted and encoded based on a scenario schema. The scenario schema can include a number of elements that can be used to describe a given environment (e.g., road segment, geographic location, geographic region, city, etc.) and road features (e.g., hazards, roads, lane markings, crosswalks, street signs, traffic signals, and the like) present within the environment for some period of time. For example, the scenario schema can include at least an element to represent agents that were detected within the environment, an element to represent agent location information within the environment, and elements to represent motion, distance, and time information associated with detected agents. For example, FIG. 1B illustrates a vehicle 152 driving on a road 154 in an environment 150. In this example, the vehicle 152 can generate one or more parameter-based encodings based on environmental information perceived by sensors of the vehicle 152. For example, a parameter-based encoding can identify a group of pedestrians 156 as agents, their locations within the environment along with corresponding motion information, distance information, and time information. In some embodiments, the location can be provided as a geometric location based on a geometric map of the environment. For example, the geometric location can be determined based on sensor data collected by the vehicle 152 (e.g., optical cameras, LiDAR, radar, infrared cameras, and ultrasound equipment). In some embodiments, the location can be provided as a semantic location based on a semantic map of the environment. For example, the semantic location can indicate the pedestrians 156 are crossing the road 154 inside of a crosswalk 158.

In some embodiments, the motion information included in the parameter-based encoding can provide an absolute orientation, velocity, acceleration, and jerk determined for the pedestrians 156. The motion information can also provide an orientation, velocity, acceleration, and jerk relative to other agents, such as the vehicle 152 (or ego vehicle).

In some embodiments, the distance information can provide absolute distances from agents to road features (e.g., hazards, roads, lane markings, crosswalks, street signs, traffic signals, and the like) within the environment and relative distances from agents to other agents within the environment. For example, the distance information can indicate an estimated distance $x_1$ between the pedestrians 156 and the vehicle 152, an estimated distance $x_2$ between the vehicle 152 and the crosswalk 158, and an estimated distance $x_3$ between the pedestrians 156 and the end of the crosswalk 158.

In some embodiments, the time information can provide estimated amounts of time for agents to reach a particular feature (e.g., hazard, road, lane marking, crosswalk, street sign, traffic signal, and the like) within the environment and estimated amounts of time for agents to reach other agents within the environment. For example, the time information can indicate an estimated amount of time $t_1$ for the pedestrians 156 to cross the crosswalk 158 and an estimated amount of time $t_2$ for the vehicle 152 to reach the crosswalk 158. Many variations are possible. As a result, parameter-based encodings of environmental information can provide an accurate and structured representation of that environment at some point in time.

In various embodiments, parameter-based encodings generated for an environment may be applied for myriad applications. For example, the parameter-based encodings can help improve scenario classification and identification. For instance, conventional approaches to scenario classification and identification can be less reliable. Under conventional approaches, when traveling on a given road segment, a computing system in a vehicle can continually process data from one or more sensors in the vehicle, for example, to identify potential hazards such as fallen debris, jaywalkers, slick road surface, and the like. Given that an environment being navigated may include a large number of agents and objects, the computing system in the vehicle must continually process sensor data to identify potential hazards that need to be addressed by the vehicle. Such processing thus requires the computing system to rapidly process and interpret unstructured sensor data which may inhibit nuanced scenario classification and identification. For example, the computing system may have difficulty discerning the difference between a pedestrian who is walking versus a pedestrian who is running. Such differences can affect which potential hazards may be experienced by the vehicle. Thus, by interpreting environmental information as parameters, the disclosed technology can identify differences and overlap between similar parameters which represent different environments and situations (or scenarios). Such parameter-based comparison allows the disclosed technology to identify optimal vehicular behaviors and responses to the different environments and situations that previously would be difficult, if not impossible, to identify when relying on conventional approaches. For example, the parameter-based encodings can allow for more consistent and reliable comparisons to be made between different environments than would be possible with unstructured environmental information. That is, the disclosed technology can search and compare data based on a consistent set of parameters to identify similarities and differences between environments and situations that otherwise may not be evident. More details discussing the disclosed technology are provided below.

Figure 2:
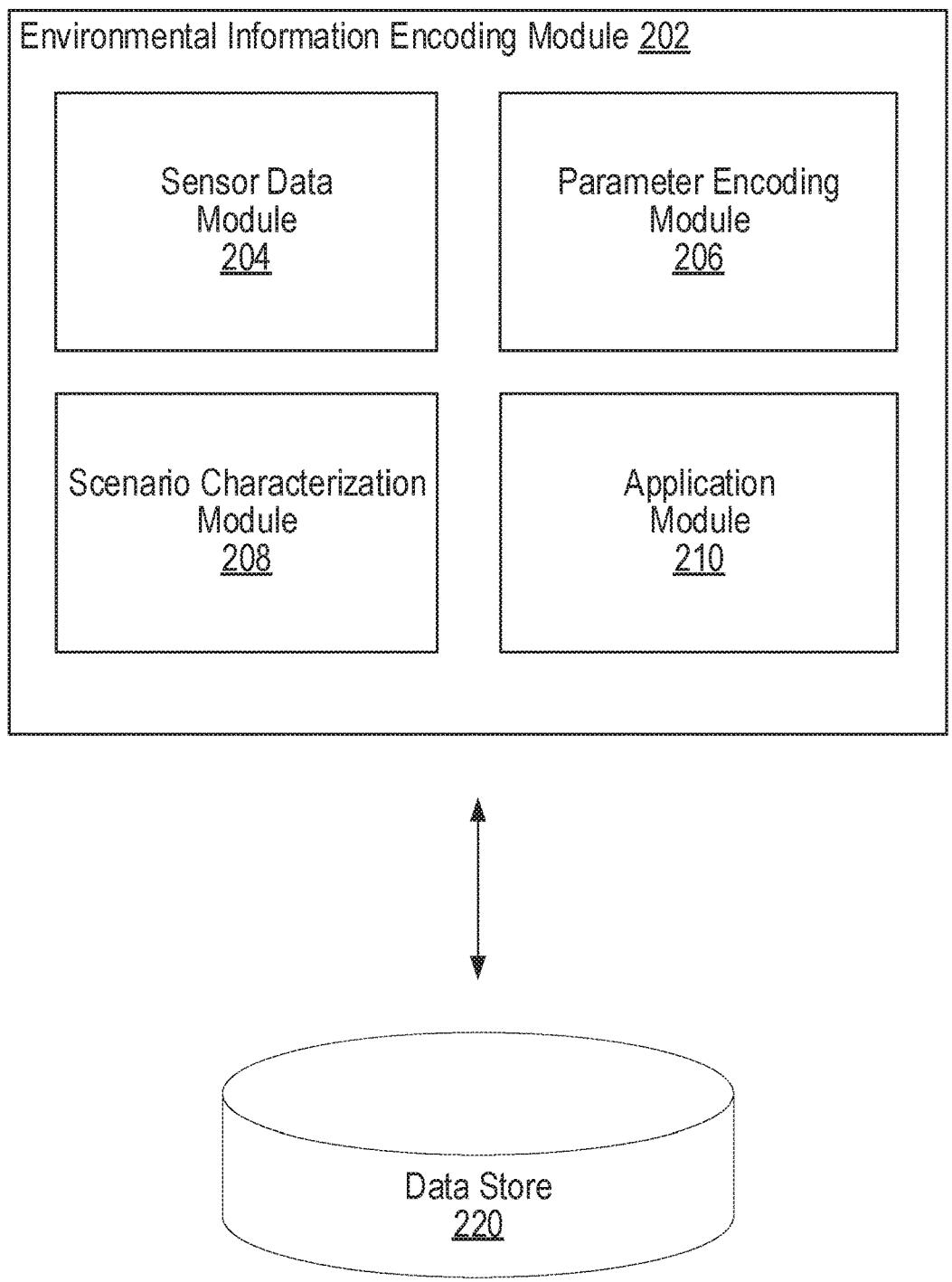
FIG. 2 illustrates an example environmental information encoding module, according to an embodiment of the present technology.

FIG. 2 illustrates an example system 200 including an example environmental information encoding module 202, according to an embodiment of the present technology. As shown in the example of FIG. 2, the environmental information encoding module 202 can include a sensor data module 204, a parameter encoding module 206, a scenario characterization module 208, and an application module 210. In some instances, the example system 200 can include at least one data store 220. The environmental information encoding module 202 can be configured to communicate and operate with the at least one data store 220. The at least one data store 220 can be configured to store and maintain various types of data. In some embodiments, some or all of the functionality performed by the environmental information encoding module 202 and its sub-modules may be performed by one or more backend computing systems, such as a transportation management system 660 of FIG. 6. In some embodiments, some or all of the functionality performed by the environmental information encoding module 202 and its sub-modules may be performed by one or more computing systems implemented in a vehicle, such as a vehicle 640 of FIG. 6. In some embodiments, some or all data stored in the data store 220 can be stored by the transportation management system 660 of FIG. 6. In some embodiments, some or all data stored in the data store 220 can be stored by the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The sensor data module 204 can be configured to access sensor data captured by vehicles. For example, the sensor data may include data captured by one or more sensors including optical cameras, LiDAR, radar, infrared cameras, and ultrasound equipment, to name some examples. The sensor data module 204 can obtain such sensor data, for example, from the data store 220 or directly from sensors associated with a vehicle in real-time (or near real-time). In some instances, the obtained sensor data may have been collected by a fleet of vehicles that offer transportation services. In some embodiments, the sensor data module 204 can determine contextual information for sensor data such as a respective calendar date, day of week, and time of day during which the sensor data was captured. Such contextual information may be obtained from an internal clock of a sensor or a computing device, one or more external computing systems (e.g., Network Time Protocol (NTP) servers), or GPS data, to name some examples. More details describing the types of sensor data that may be obtained by the sensor data module 204 are provided below in connection with an array of sensors 644 of FIG. 6.

Figure 3A:
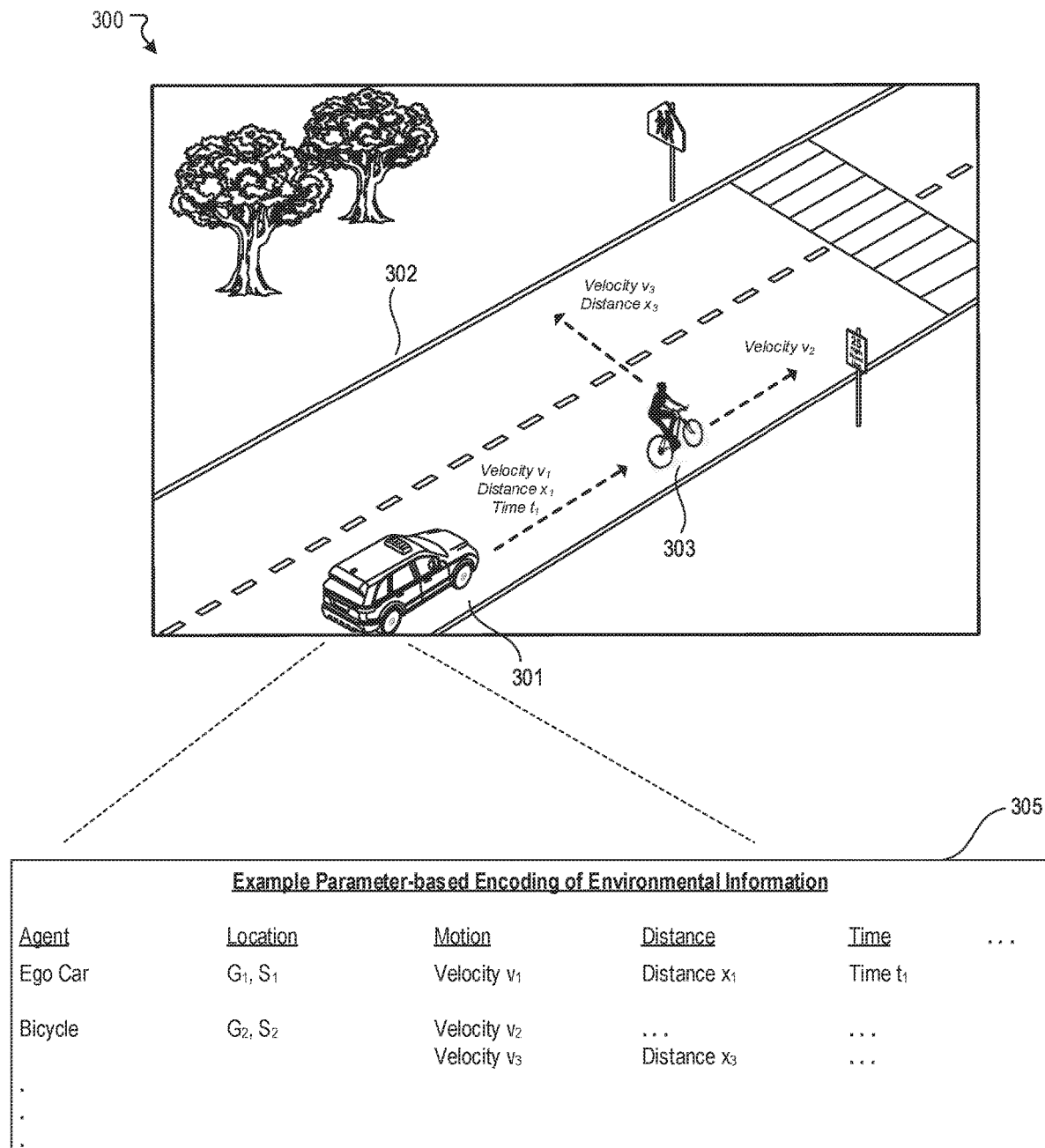
FIGS. 3A-3H illustrate example diagrams, according to an embodiment of the present technology.

The parameter encoding module 206 can be configured to encode environmental information based on a predefined scenario schema. For example, vehicles navigating an environment can capture sensor data that describes the environment at various points in time. In this example, the parameter encoding module 206 can analyze the captured sensor data to identify various features describing the environment. The parameter encoding module 206 can then encode the features based on the predefined scenario schema. Thus, the predefined scenario schema can be used to represent various types of environments (e.g., geographic locations, geographic regions, road segments, etc.) in a consistent and structured manner. In some embodiments, the predefined scenario schema includes a set of elements that can be used to represent various aspects of a given environment. For example, the predefined scenario schema can include at least a first element to represent agents that were detected by sensors of a vehicle while navigating an environment. For example, an agent can be a static or dynamic object present within the environment and can be defined as a particular type of agent (e.g., vehicle, pedestrian, bicyclist, animal, debris, etc.). The predefined scenario schema can include a second element to represent agent location information within the environment. Further, the predefined scenario schema can include a third element to represent motion information associated with detected agents, a fourth element to represent distance information associated with detected agents, and a fifth element to represent time information associated with detected agents. These elements are provided merely as examples and, naturally, the predefined scenario schema may be modified to include additional or fewer elements depending on the implementation. In various embodiments, the parameter encoding module 206 can encode environmental information captured by sensors of a vehicle based on this predefined scenario schema. In some embodiments, a parameter-based encoding of the environment 300 based on the predefined scenario schema can provide a structured representation of features associated with the environment 300 during some period of time. For example, FIG. 3A illustrates a vehicle 301 ("Ego Car") navigating an environment 300. In this example, the vehicle 301 can capture various sensor data describing the environment 300 while driving on a road 302. The sensor data can be captured by the vehicle 301 over some period of time at pre-defined time intervals. In some embodiments, the parameter encoding module 206 can analyze the captured sensor data to determine the presence of agents within the environment 300, such as an agent vehicle 303 ("Bicycle"). For example, one or more machine learning models can be trained to recognize agents within the environment 300 based on the captured sensor data, such as image data capture by optical cameras of the vehicle 301, point clouds captured by a LiDAR system in the vehicle 301, and radar data captured by a radar system in the vehicle 301, to name some examples. In some embodiments, the parameter encoding module 206 can also analyze the captured sensor data to determine agent locations. For example, a location associated with the bicycle 303 can be represented as a geometric location and a semantic location. For example, the geometric location can be determined in reference to a geometric map based on sensor data collected by the vehicle 301 (e.g., optical cameras, LiDAR, radar, infrared cameras, and ultrasound equipment). In another example, the location associated with the bicycle 303 can be represented as a semantic location based on a semantic map of the environment. The semantic location can provide more descriptive location details, such as whether an agent is on a sidewalk or road surface, whether an agent is in a bicycle lane, and whether an agent is in a first lane or a second lane of a road on which the agent is driving. For example, the semantic location can indicate the bicycle 303 is traveling in a second lane associated with the road 302. In some embodiments, the parameter encoding module 206 can determine motion information for the agents. The motion information can provide a position, direction of travel, orientation, velocity, acceleration, and jerk for the bicycle 303 in absolute and relative terms. For example, the motion information for the vehicle 301 can provide an absolute velocity of the vehicle 301 and a velocity $v_1$ of the vehicle 301 relative to the bicycle 303. In another example, the motion information for the bicycle 303 can provide an absolute velocity $v_2$ of the bicycle 303 and a lateral velocity of $v_3$ of the bicycle 303. In some embodiments, the parameter encoding module 206 can determine distance information for the agents. The distance information can provide estimated distances for agents relative to other agents and road features (e.g., hazards, roads, lane markings, crosswalks, street signs, traffic signals, and the like) within the environment. For example, the distance information for the vehicle 301 includes a distance $x_1$ determined between the vehicle 301 and the bicycle 303. Further, the distance information for the bicycle 303 includes a lateral distance $x_3$ determined between an edge of the road 302 and the bicycle 303. In some embodiments, the parameter encoding module 206 can determine time information for the agents. The time information can provide estimated amounts of time for agents to reach a particular feature (e.g., hazards, roads, lane markings, crosswalks, street signs, traffic signals, and the like) within the environment and estimated amounts of time for agents to reach (or interact with) other agents within the environment. For example, the time information for the vehicle 301 includes a time $t_1$ estimated for the vehicle 301 to reach the bicycle 303. The information determined by the parameter encoding module 206 can be encoded as a parameter-based encoding 305.

In some embodiments, the parameter encoding module 206 can perform unsupervised parameterization of environmental information without requiring a predefined scenario schema. For example, the parameter encoding module 206 can automatically learn environmental features that are and are not relevant based on raw data and the features. In this example, the parameter encoding module 206 can parameterize environmental that are determined to be relevant. Thus, the parameter encoding module 206 can learn different relationships and features that are relevant to a given environment or situation based on raw or labeled sensor data, and can automatically determine its own parameters, schemas, and related groupings.

In some embodiments, the parameter encoding module 206 can determine location, motion, distance, and time information for agents as an offline process. For example, agent behavior (e.g., direction of travel, velocity, distance from other agents, etc.) can be observed and recorded by the vehicle 301. In this example, the observed agent behavior can be processed as part of the offline process, for example, for purposes of scenario classification. In some embodiments, the environment 300 of FIG. 3A can be reconstructed from sensor data collected by the vehicle 301. For instance, the environment 300 can be rasterized from sensor data alone without requiring a 360 degree representation of the environment 300. That is, the environment 300 can be reconstructed by generating a scene with detected agents at their inferred locations within the environment 300. For example, the scene can be generated from a single camera capture over time as the vehicle 301 navigates the environment 300 (e.g., approaches an intersection). In this example, agent positions can be inferred based on collected information.

Figure 3B:
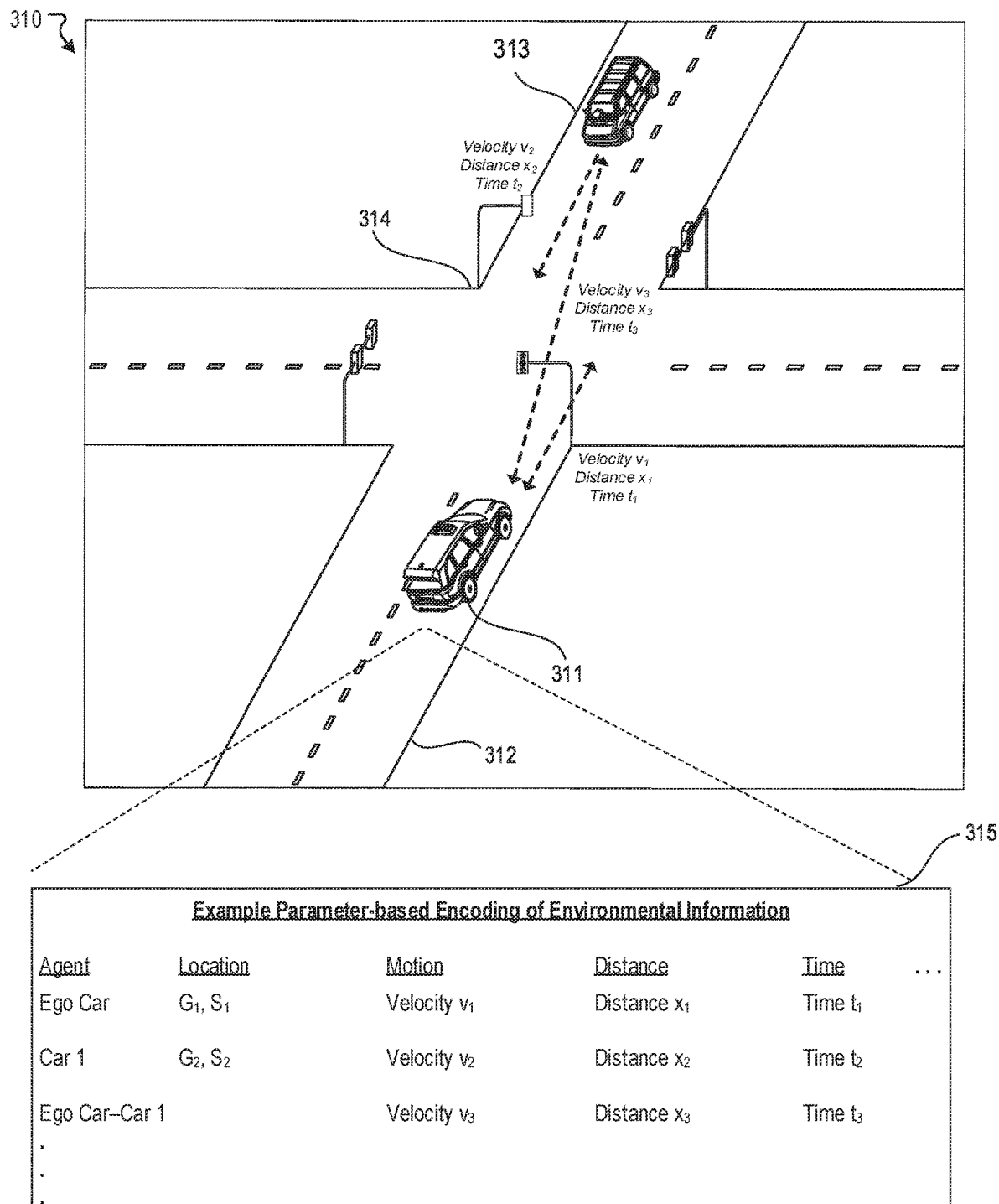

In another example, FIG. 3B shows a vehicle 311 preparing to make an unprotected left-turn while driving on a road 312 within an environment 310. The vehicle 311 can capture various sensor data while driving on the road 312. The captured sensor data can describe features associated with the environment 310, such as the presence of a vehicle 313 approaching an intersection 314. In this example, the parameter encoding module 206 can generate a structured representation of the environment 310 as a parameter-based encoding 315. The parameter-based encoding 315 can provide location information for agents in the environment 310, including respective geometric and semantic locations. The parameter-based encoding 315 can also provide determined motion, distance, and time information for the agents in the environment 310. In this example, the parameter-based encoding 315 provides an absolute velocity $v_1$ for the vehicle 311, an estimated distance $x_1$ between the vehicle 311 and the intersection 314, and an estimated amount of time $t_1$ for the vehicle 311 to reach the intersection 314. The parameter-based encoding 315 also provides an absolute velocity $v_2$ for the vehicle 313, an estimated distance $x_2$ between the vehicle 313 and the intersection 314, and an estimated amount of time $t_2$ before the vehicle 313 reaches the intersection 314. The parameter-based encoding 315 also provides a velocity $v_3$ for the vehicle 311 relative to the vehicle 313, an estimated distance $x_3$ between the vehicle 311 and the vehicle 313, and an estimated amount of time $t_3$ before the vehicle 311 reaches the vehicle 313. In various embodiments, parameter-based encodings can be used for various applications, such as characterizing scenarios, as described in reference to the scenario characterization module 208.

Figure 3C:
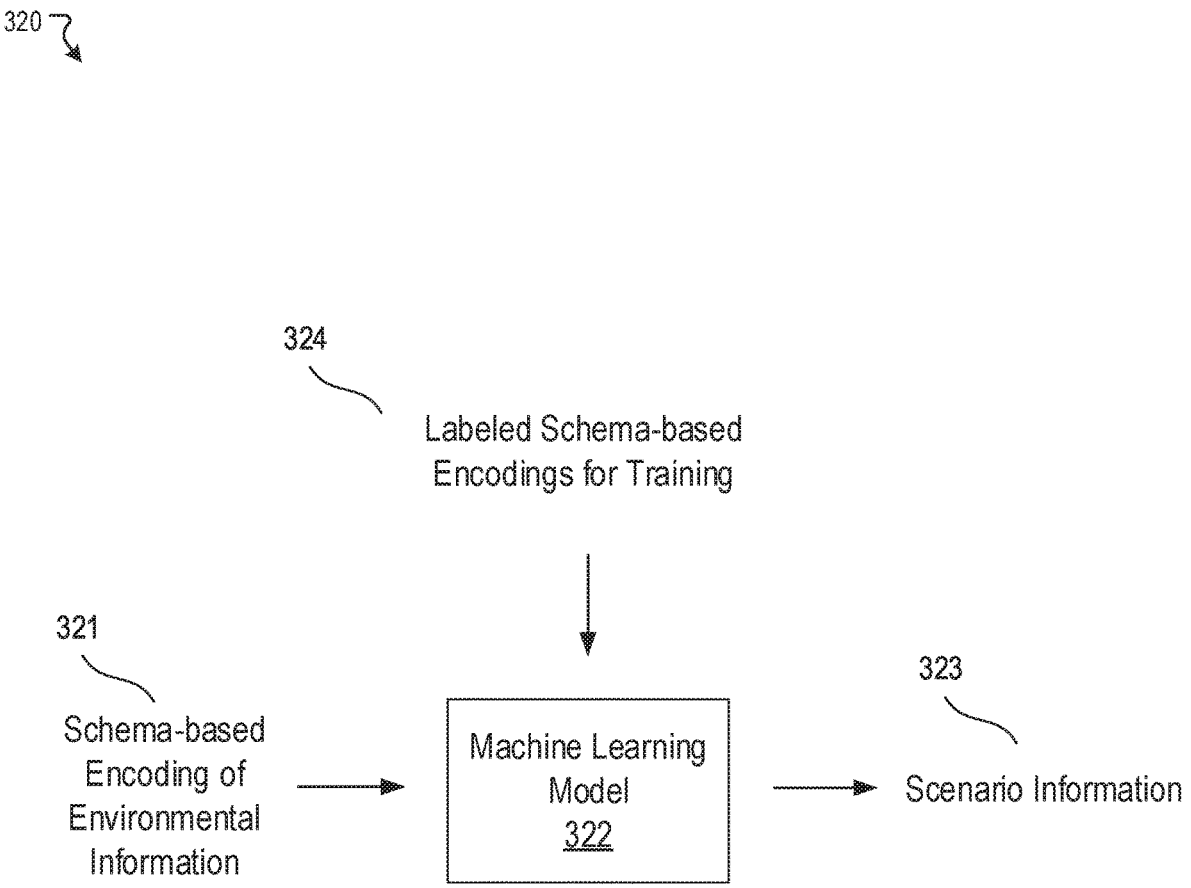

The scenario characterization module 208 can be configured to determine scenario information (e.g., scenarios, scenario families, scenario sub-families, etc.) associated with environments (e.g., a road segment, a geographic location, a geographic region, city, etc.) based on parameter-based encodings of those environments. The parameter-based encodings may be determined based on sensor data captured by a vehicle, such as a vehicle 640 of FIG. 6, or a fleet of such vehicles while navigating those environments. For example, the scenario characterization module 208 can obtain a parameter-based encoding 321 that was generated for an environment for some period of time, as illustrated in an example diagram 320 of FIG. 3C. In some embodiments, the scenario characterization module 208 can determine scenario information associated with the environment during the period of time based on the parameter-based encoding 321. For example, the scenario characterization module 208 can provide the parameter-based encoding 321 of the environment as input to a machine learning model 322. The machine learning model 322 can evaluate the parameter-based encoding 321 to determine scenario information 323 associated with the environment during the period of time. For example, the machine learning model 322 can be trained to determine scenario families, scenario sub-families, and individual scenarios based upon an evaluation of the parameter-based encoding 321. For example, the scenario families, scenario sub-families, and individual scenarios which the machine learning model 322 is trained to recognize can be organized as a multi-level or tiered taxonomy reflecting varying degrees of generality and specificity. An example taxonomy may include a set of pre-defined scenario families and respective scenarios classified within each of the scenario families. For example, a scenario family corresponding to interactions involving pedestrians may include a first scenario corresponding to jaywalkers and a second scenario corresponding to pedestrians jogging along a road. In some embodiments, the scenario characterization module 208 can train the machine learning model 322 based on labeled parameter-based encodings 324 that were generated for various environments. In some embodiments, the parameter-based encodings 324 can be manually labeled by humans. For example, a parameter-based encoding of an environment can be labeled manually to identify scenarios and scenario families associated with the environment.

Figure 3D:
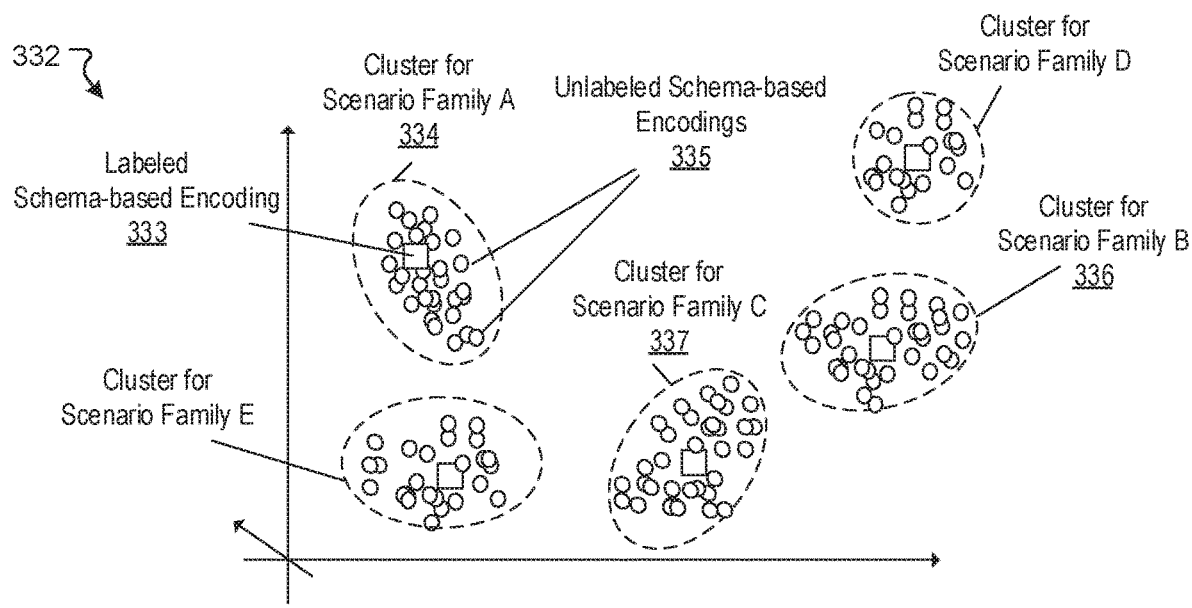

In some embodiments, a portion of the parameter-based encodings 324 may be labeled manually and this portion of parameter-based encodings 324 can be used to automatically label other unlabeled parameter-based encodings. For example, the scenario characterization module 208 can apply generally known techniques to cluster parameter-based encodings (or embeddings of parameter-based encodings) based on similarity within some high-dimensional space, as illustrated in the example of FIG. 3D. The clusters of parameter-based encodings can be used to determine various scenario information for different environments. For example, FIG. 3D shows a diagram 332 of parameter-based encodings projected in high-dimensional space. For example, in some embodiments, each parameter-based encoding can be represented as a feature vector including features that were included in the parameter-based encoding (e.g., agents, locations, motion information, distance information, time information, etc.). These feature vectors can be plotted and clustered in high-dimensional space based on similarity to identify scenario families and sub-families. In the example of FIG. 3D, a labeled parameter-based encoding 333 is included in a first cluster 334 of parameter-based encodings. In this example, the scenario characterization module 208 can classify unlabeled parameter-based encodings 335 that were included in the first cluster 334 as belonging to the same scenario family (or scenario) as the labeled parameter-based encoding 333. For example, in FIG. 3D, a determination may be made that parameter-based encodings included in the first cluster 334 all correspond to a family of scenarios that involve some interaction between an ego vehicle and pedestrians. In another example, a determination may be made that parameter-based encodings included in a second cluster 336 all correspond to a family of scenarios that involve some interaction between an ego vehicle and other vehicles. In yet another example, a determination may be made that parameter-based encodings included in a third cluster 337 all correspond to a family of scenarios that involve some interaction between an ego vehicle and animals. Many variations are possible.

In some embodiments, clusters can be labeled manually. For example, a human may evaluate and label a cluster of parameter-based encodings as representing a particular family of scenarios. In some embodiments, the scenario characterization module 208 can refine these clusters at varying levels of granularity to determine scenario sub-families and individual scenarios. For example, pedestrians walking may be involved in different sub-scenarios depending on various factors (e.g., their speed of travel, their location in relation to an ego vehicle, their distance from a sidewalk, etc.). The refinement of clusters can help discern between scenario sub-families and individual scenarios. The parameter-based encodings that correspond to such refined clusters can be used to train machine learning models to predict scenario information at various levels of granularity. For example, a scenario involving a vehicle cutting in front of an ego car can be segmented into a first sub-scenario involving a vehicle driving on an onramp that cuts in front of an ego car, a second sub-scenario involving a vehicle exiting a parking lot that cuts in front of an ego car, and a third sub-scenario involving a vehicle driving in one lane that cuts in front of an ego car driving in another lane. In various embodiments, different vehicle behaviors can be assigned to such sub-scenarios, as discussed below. For example, to improve ride comfort, a vehicle can be instructed to decelerate differently depending on the sub-scenario encountered. For example, the vehicle may decelerate at a slower rate when the third sub-scenario is encountered than when the second sub-scenario is encountered. Many variations are possible.

In some embodiments, the scenario characterization module 208 can determine potentially new scenarios or scenario families based on a clustering of unlabeled parameter-based encodings associated with various environments. For example, there may be a cluster of parameter-based encodings in which no labeled parameter-based encoding was included. This cluster thus represents parameter-based encodings that are share similar parameter values but for which no label could be determined. In some embodiments, these clusters can be used to identify potentially new scenarios and scenario families that are likely to be encountered by vehicles while navigating environments. As a result, these potentially new scenarios and scenario families can be analyzed based on respective parameter values so that vehicles can adequately be trained to recognize and appropriately maneuver when encountering such scenarios and scenario families.

Figure 3E:
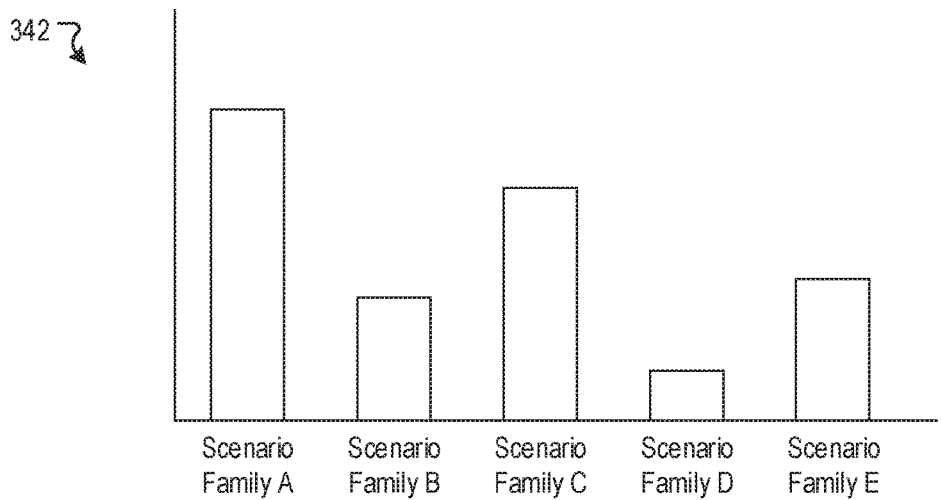

In some embodiments, the scenario characterization module 208 can generate information (e.g., histograms) representing scenario information for various environments (e.g., a road segment, a geographic location, a geographic region, a city, etc.). For example, the scenario characterization module 208 can generate a histogram 342 that represents respective frequencies of families of scenarios that were experienced by vehicles while navigating an environment, as illustrated in the example of FIG. 3E. In this example, the histogram 342 can be evaluated to determine exposure rates for different families of scenarios for the environment. In some embodiments, the scenario characterization module 208 can also generate histograms that represent respective frequencies of individual scenarios that were experienced by vehicles while navigating an environment. In such embodiments, the histograms can be evaluated to determine exposure rates for different individual scenarios for the environment. Depending on the implementation, the term "environment" can encompass an area as small as an intersection or road segment and as large as a region, city, or state, to name some examples.

Figure 3F:
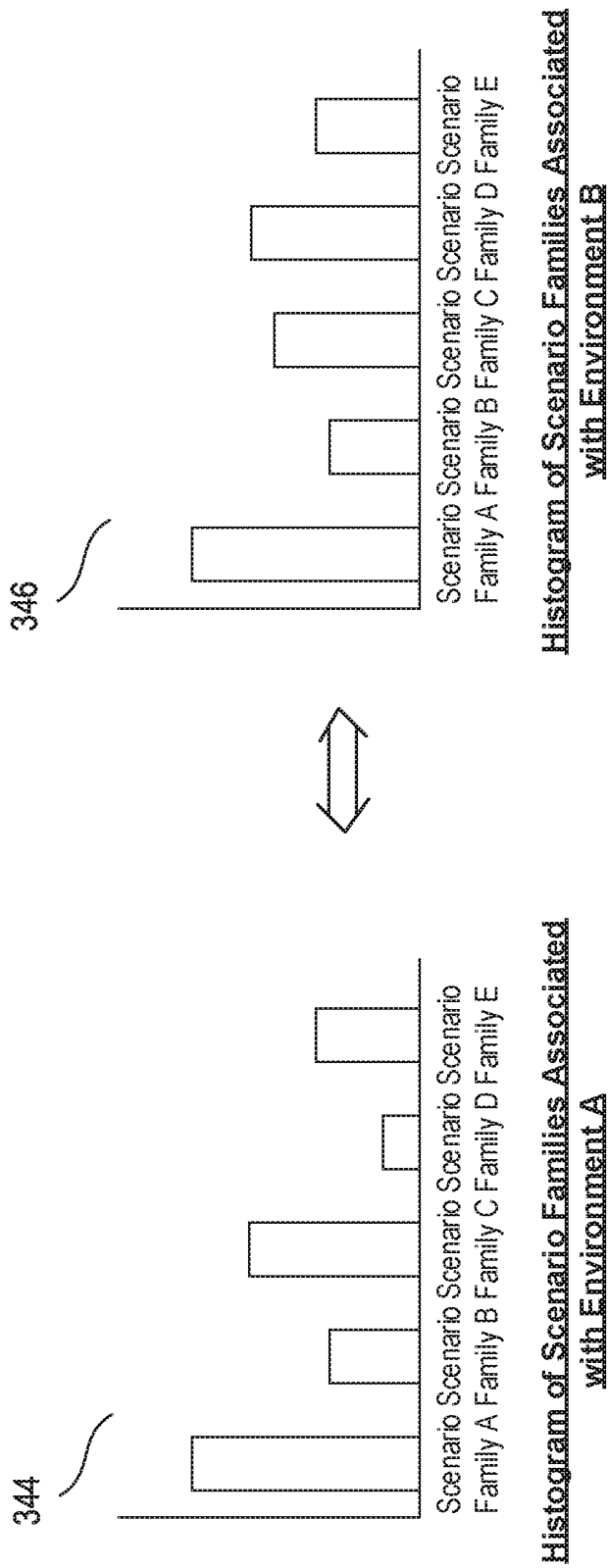

The application module 210 can be configured to use parameter-based encodings and information derived from such encodings for various applications. For example, in some embodiments, histograms representing frequencies of families of scenarios (or individual scenarios) associated with a given environment (e.g., road segment, geographic location, geographic region, city, etc.) can be used to make various comparisons between different environments, as illustrated in the example of FIG. 3F. For example, FIG. 3F illustrates a first histogram 344 representing frequencies of scenario families associated with a first environment and second histogram 346 representing frequencies of scenario families associated with a second environment. In various embodiments, the application module 210 can determine a level of similarity between the first and second environments based on a comparison of the first histogram 344 and the second histogram 346. For example, the first histogram 344 may represent families of scenarios associated with a city Palo Alto, Calif. and the second histogram 346 may represent families of scenarios associated with a different city Portland, Oreg. In this example, a threshold similarity between the first histogram 344 and the second histogram 346 can indicate that vehicles navigating the city of Portland face challenges that are similar to those faced by vehicles navigating the city of Palo Alto. Many variations are possible. For example, in some embodiments, each family of scenarios associated with the first histogram 344 can be associated with a difficulty profile representing a level of difficulty with which a vehicle is expected to autonomously or semi-autonomously respond to the family of scenarios (e.g., a difficulty profile). In such embodiments, a threshold similarity between the first histogram 344 and the second histogram 346 can indicate that vehicles navigating the first and second environments encounter a similar level of difficulty. In some embodiments, each family of scenarios associated with the first histogram 344 can be associated with a risk profile representing a level of risk posed by the family of scenarios. In such embodiments, a threshold similarity between the first histogram 344 and the second histogram 346 can indicate that vehicles navigating the first and second environments encounter a similar level of risk.

Figure 3G:
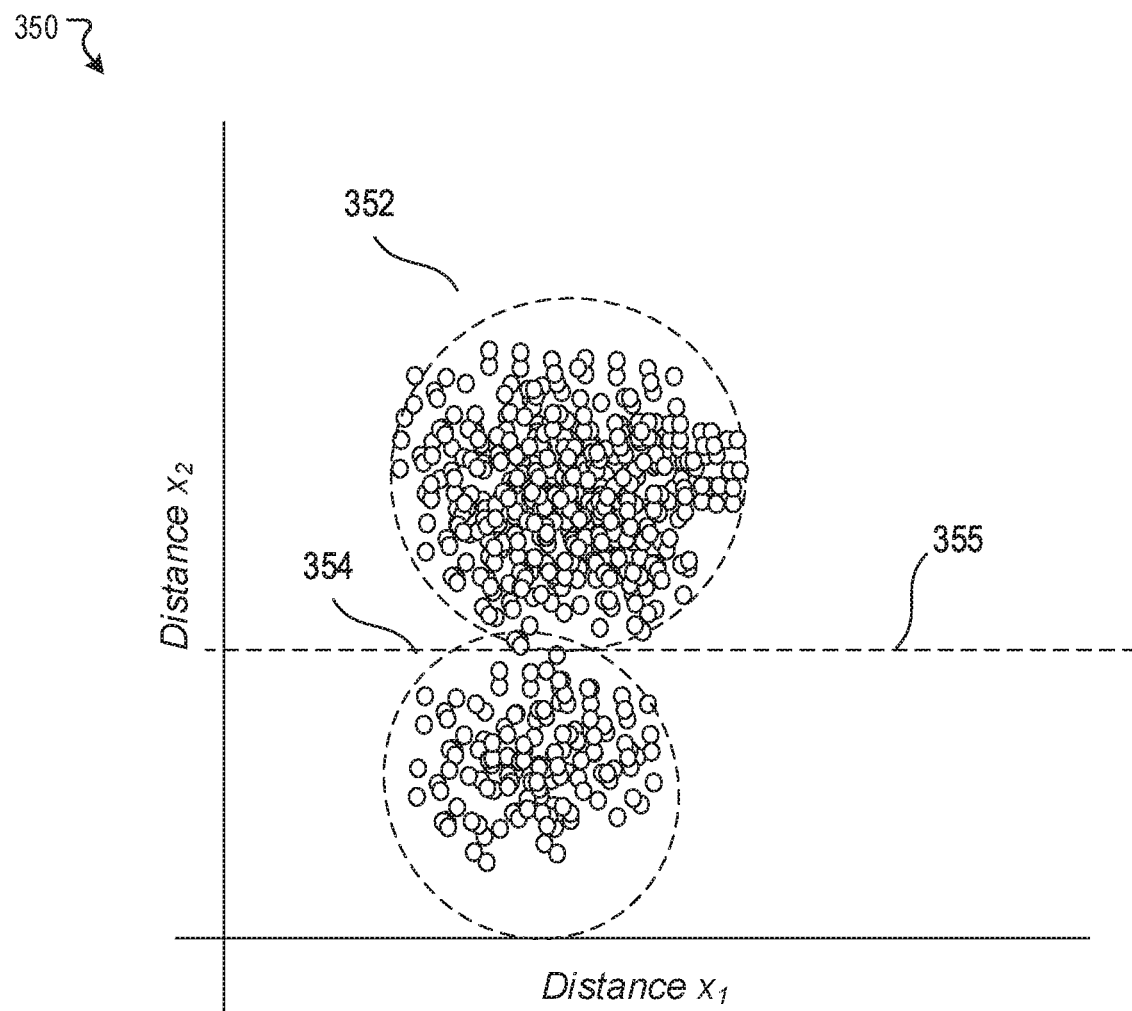

The application module 210 can be configured to determine vehicle behavior that can be performed in response to various scenarios. For example, in some embodiments, the application module 210 can determine sub-clusters from clusters of parameter-based encodings. These sub-clusters can be used to distinguish between different types of sub-scenarios that can be associated with different vehicle behaviors. For example, FIG. 3G illustrates an example plot 350 of parameter-based encodings representing a scenario involving a bicyclist riding in front of an ego vehicle, as illustrated in the environment 300 of FIG. 3A. The plot 350 represents the scenario with distances $x_1$ (e.g., distance between an ego vehicle and bicyclist) and $x_2$ (e.g., distance between bicyclist and sidewalk associated with its direction of travel) as obtained from the parameter-based encodings included in the plot 350. As shown, the plot 350 plots distances $x_1$ along the x-axis and distances $x_2$ along the y-axis. In this example, the application module 210 can determine a first sub-cluster 352 and a second sub-cluster 354 of the parameter-based encodings. For example, the first sub-cluster 352 represents instances where a bicyclist was riding in front of an ego vehicle at least a threshold distance 355 from a sidewalk and the second sub-cluster 354 represents instances where a bicyclist was riding within the threshold distance 355 from the sidewalk. In this example, the first sub-cluster 352 and the second sub-cluster 354 of the parameter-based encodings can be assigned different vehicle behavior. For example, when a bicyclist is riding at least the threshold distance 355 from a sidewalk, a vehicle can be instructed to maneuver around the bicyclist by switching lanes. In another example, when a bicyclist is riding within the threshold distance 355 from a sidewalk, the vehicle can be instructed to maneuver around the bicyclist without switching lanes.

Figure 3H:
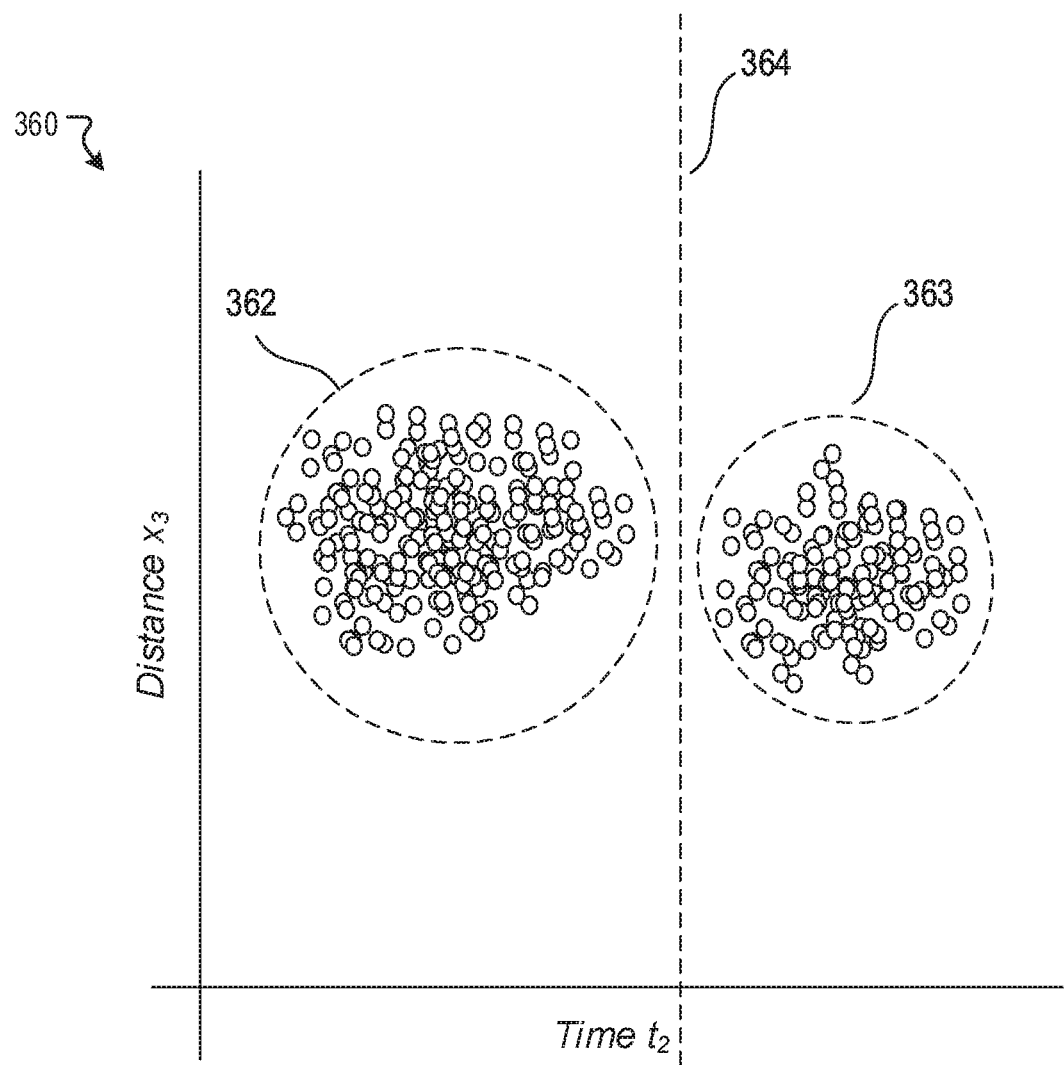

In another example, FIG. 3H illustrates an example plot 360 of parameter-based encodings representing a scenario involving an ego vehicle making an unprotected left-turn at an intersection, as illustrated in the environment 310 of FIG. 3B. The plot 360 represents the scenario with a distance $x_3$ (e.g., a distance between an ego vehicle and oncoming vehicle) and time $t_2$ (e.g., an amount of time before the oncoming vehicle reaches the intersection) as obtained from the parameter-based encodings included in the plot 360. As shown, the plot 360 plots time $t_2$ along the x-axis and distance $x_3$ along the y-axis. In this example, the application module 210 can determine a first sub-cluster 362 and a second sub-cluster 363 of the parameter-based encodings. For example, the first sub-cluster 362 can represent instances where a vehicle was not able to perform an unprotected left-turn at an intersection due to an oncoming vehicle requiring less than a threshold amount of time 364 to reach the intersection. The second sub-cluster 363 can represent instances where a vehicle was able to perform an unprotected left-turn at an intersection due to an oncoming vehicle requiring at least the threshold amount of time 364 to reach the intersection. In this example, the first sub-cluster 362 and the second sub-cluster 363 of the parameter-based encodings can be assigned different vehicle behavior. For example, given some distance, a vehicle can be permitted to make an unprotected left-turn at an intersection when at least the threshold amount of time 364 is available. Similarly, the vehicle can be instructed not to make an unprotected left-turn at an intersection when less than the threshold amount of time 364 is available. The plots 350 and 360 are provided as examples and, in general, parameter-based encodings can be clustered across any of dimensions described herein including agent geometric locations, agent semantic locations, agent motion information, agent distance information, agent time information, and any combination thereof.

In some embodiments, the application module 210 can generate simulations of scenarios for purposes of evaluating software (e.g., models) relating to autonomous and semi-autonomous driving. For example, the application module 210 can extract parameter values from individual parameter-based encodings to simulate (or recreate) scenarios that were experienced by vehicles in a real-world setting. For example, the parameter-based encodings may be generated by a fleet of vehicles that offer transportation services. In this example, the parameter-based encodings can be used to replay a given scenario by providing parameter values captured in the parameter-based encodings as inputs to the software (or model) being evaluated. In another example, parameter-based encodings may be used to artificially compose new scenarios on which the software can be tested. In various embodiments, the results of such simulations can be used to refine (or tune) the software being evaluated. Many variations are possible.

Figure 4:
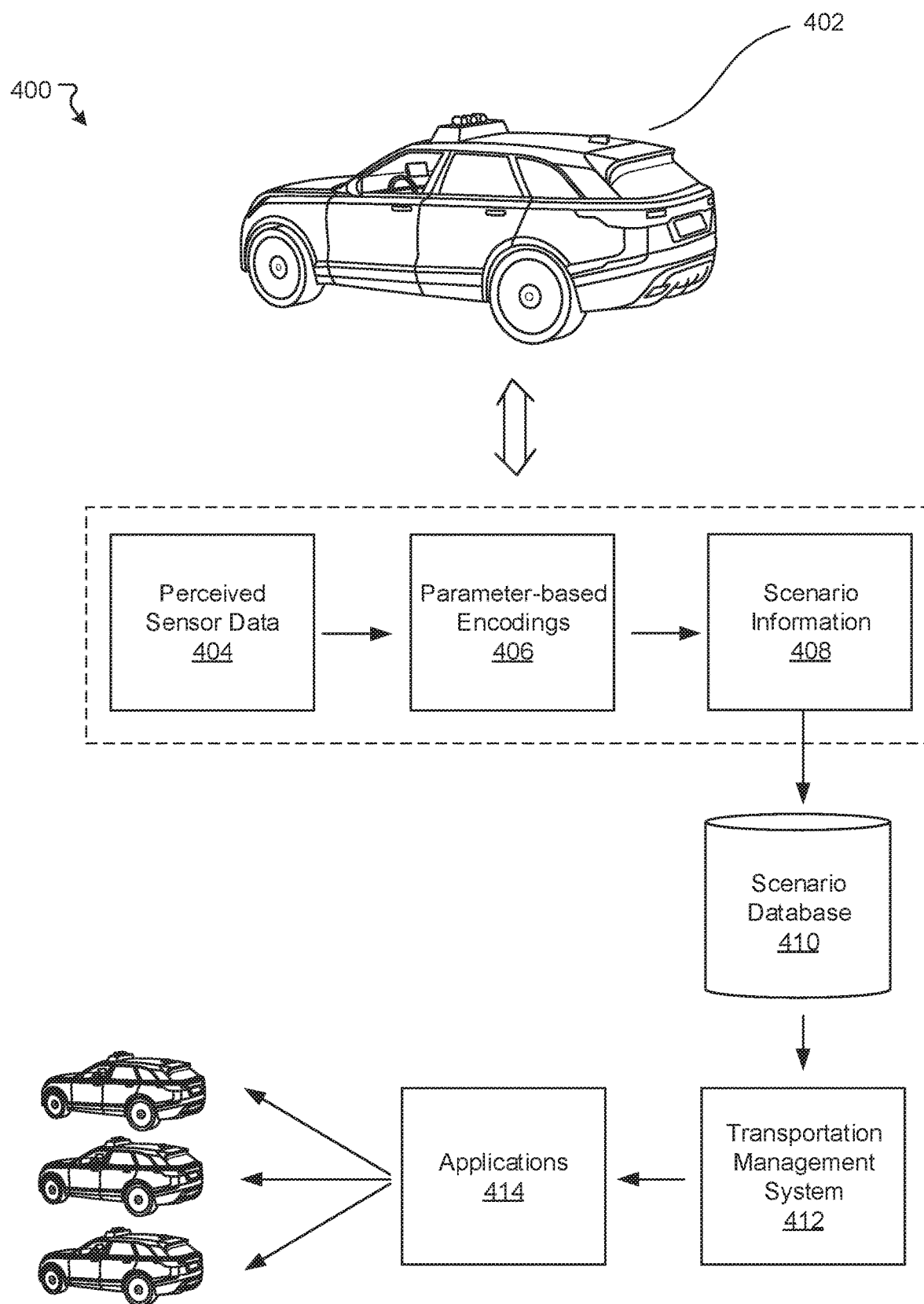
FIG. 4 illustrates an example diagram of an approach for interpreting environmental information based on parameter-based encodings and applying those encodings for various applications, according to an embodiment of the present technology.
Figure 6:
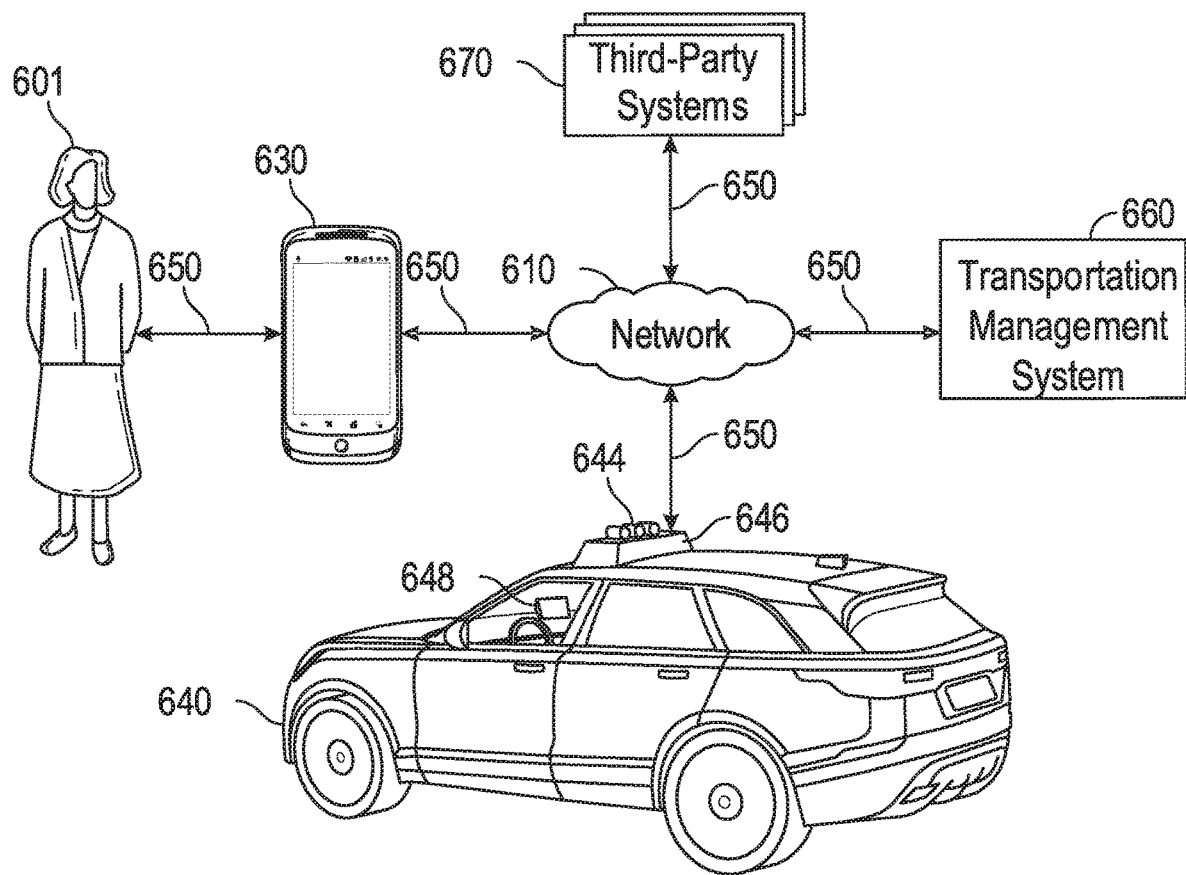
FIG. 6 illustrates an example block diagram of a transportation management environment, according to an embodiment of the present technology.

FIG. 4 illustrates an example diagram 400 of an approach for encoding and utilizing parameter-based encodings based on functionality of the environmental information encoding module 202, according to an embodiment of the present technology. In this example, the approach can be implemented by a vehicle 402. The vehicle 402 can be, for example, the vehicle 640 as shown in FIG. 6. For example, at block 404, sensor data captured by sensors in the vehicle 402 while navigating an environment can be obtained. At block 406, the sensor data can be used to generate parameter-based encodings for a given environment (e.g., road segment, geographic location, geographic region, city, etc.), as described above. At block 408, the parameter-based encodings can be used to determine scenario information for the environment, as described above. In various embodiments, the scenario information can be accessed by a transportation management system 412 (e.g., the transportation management system 660 of FIG. 6). For example, the scenario information can be stored in a scenario database 410. In various embodiments, the scenario information can be used by the transportation management system 412 for various applications 414, such as modifying vehicle operation based on a scenario or sub-scenario, as described above. In various embodiments, vehicular responses can be implemented by different path planning and prediction functional modules that control the trajectory and plan of the vehicle where each planning module may be implemented or used for different scenarios or situations that are identified by the vehicle. Many variations are possible.

Figure 5A:
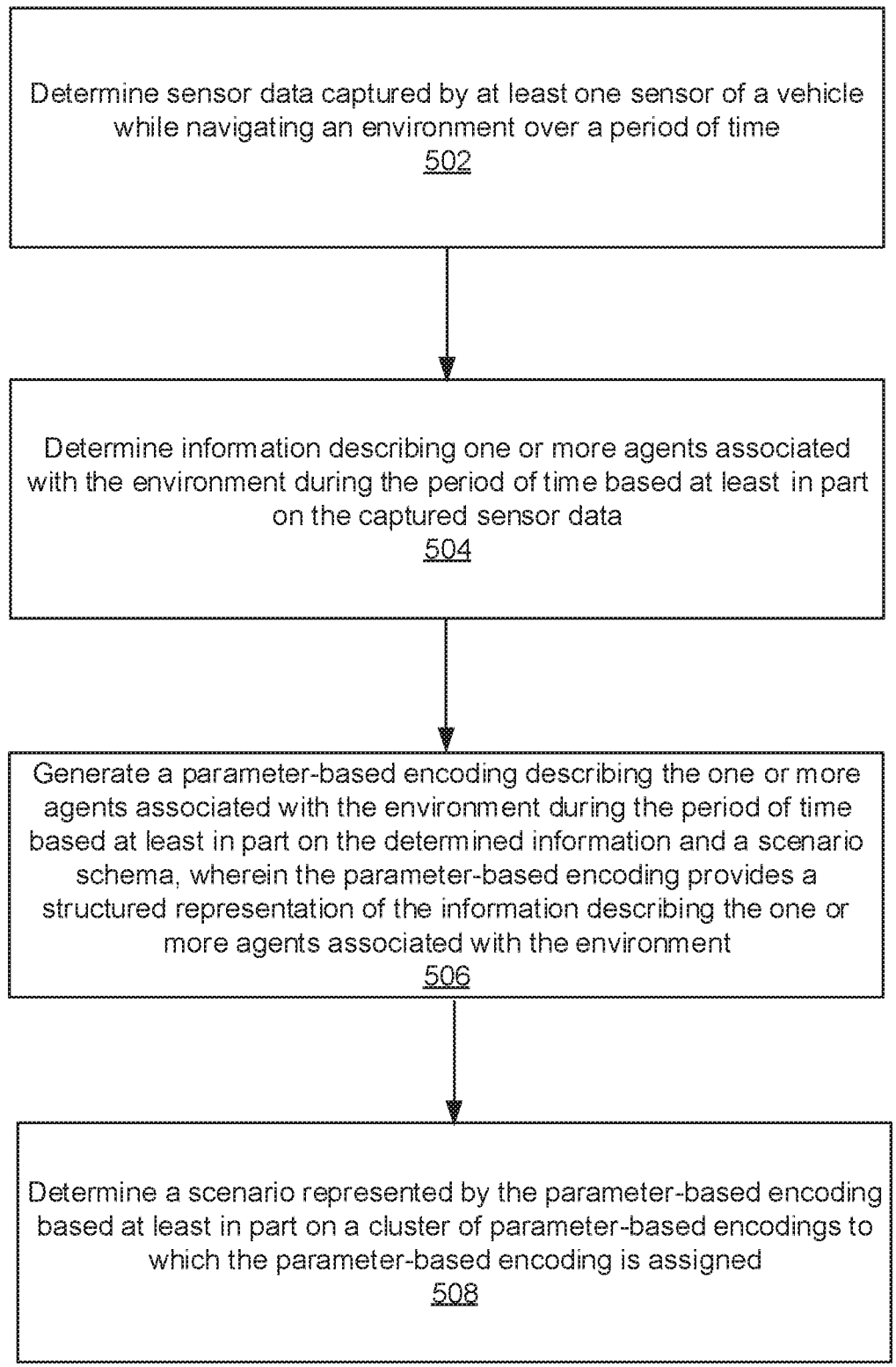

FIG. 5A illustrates an example method 500, according to an embodiment of the present technology. At block 502, sensor data captured by at least one sensor of a vehicle while navigating an environment over a period of time can be determined. At block 504, information describing one or more agents associated with the environment during the period of time can be determined based at least in part on the captured sensor data. At block 506, a parameter-based encoding describing the one or more agents can be generated based at least in part on the determined information and a scenario schema, wherein the parameter-based encoding provides a structured representation of the one or more agents associated with the environment. At block 508, a scenario represented by the parameter-based encoding can be determined based at least in part on a cluster of parameter-based encodings to which the parameter-based encoding is assigned.

FIG. 5B illustrates an example method 520, according to an embodiment of the present technology. At block 522, a plurality of parameter-based encodings providing a structured representation of an environment captured by one or more sensors of vehicles traveling through the environment can be accessed. A given parameter-based encoding of the environment identifies one or more agents that were detected by a vehicle within the environment and respective location information for the one or more agents within the environment. At block 524, the plurality of parameter-based encodings can be clustered into one or more clusters of parameter-based encodings. At block 526, at least one scenario associated with the environment can be determined based at least in part on the one or more clusters of parameter-based encodings.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the environmental information encoding module 202 may be implemented by one or more computing systems of the transportation management system 660. In some embodiments, some or all modules of the environmental information encoding module 202 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
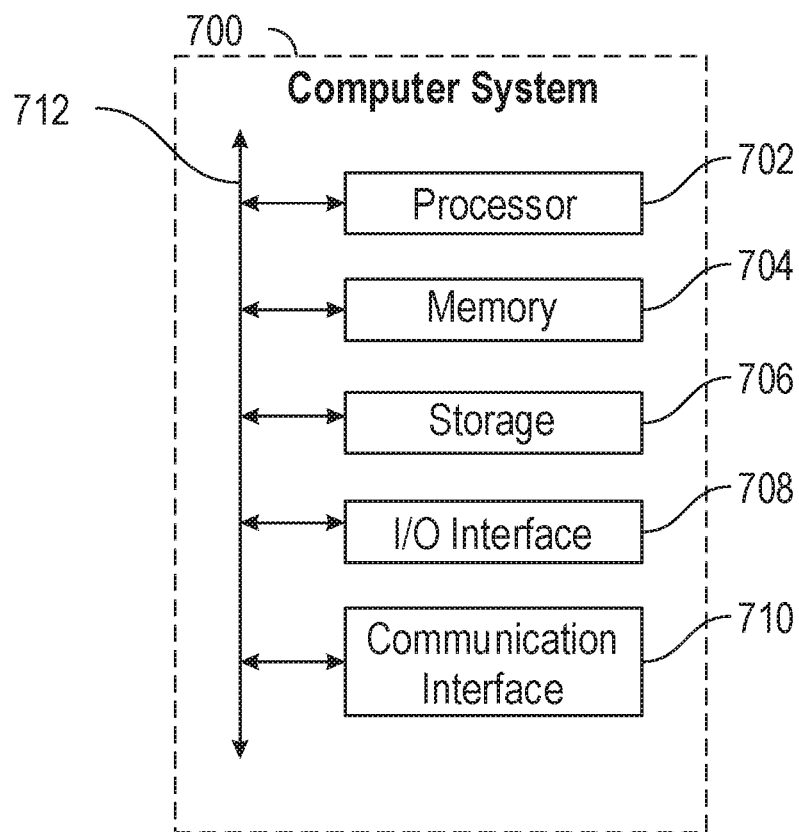
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
    accessing, by a computing system, a plurality of parameter-based encodings providing a structured representation of an environment captured by one or more sensors associated with a plurality of vehicles traveling through the environment, wherein a given parameter-based encoding identifies one or more agents that were detected by a vehicle of the plurality of vehicles within the environment and at least one of: respective location information, distance information, motion information, or time information for the one or more agents within the environment, and wherein the plurality of parameter-based encodings are clustered into one or more clusters of parameter-based encodings;
    determining, by the computing system, at least one scenario associated with the environment based at least in part on the one or more clusters of parameter-based encodings;
    determining, by the computing system, vehicle behavior for the vehicle based at least in part on instances in the one or more clusters of parameter-based encodings where other vehicles of the plurality of vehicles navigated the at least one scenario; and
    causing, by the computing system, control of an operation of the vehicle based on the determined vehicle behavior.

2. The computer-implemented method of claim 1, wherein causing control of the operation of the vehicle includes performing a maneuver based on the instances where the other vehicles navigated the at least one scenario indicating the other vehicles were able to perform the maneuver, or not performing the maneuver based on the instances where the other vehicles navigated the at least one scenario indicating the other vehicles were not able to perform the maneuver.

3. The computer-implemented method of claim 1, wherein the plurality of parameter-based encodings are clustered into the one or more clusters of parameter-based encodings by:
    generating respective feature vector representations for each of the plurality of parameter-based encodings; and
    clustering the feature vector representations based on similarity to determine the one or more clusters of parameter-based encodings.

4. The computer-implemented method of claim 3, wherein a feature vector representation includes two or more features corresponding to location information for the one or more agents, motion information for the one or more agents, distance information for the one or more agents, time information for the one or more agents, or a combination thereof.

5. The computer-implemented method of claim 4, wherein the location information provides a geometric location for an agent with respect to a geometric map of the environment, a semantic location for the agent with respect to a semantic map of the environment, or both.

6. The computer-implemented method of claim 4, wherein the motion information provides a position, direction of travel, orientation, velocity, acceleration, and jerk for an agent in absolute or relative terms, wherein the distance information for the agent includes relative distances between one or more other agents in the environment or one or more road features in the environment, or wherein the time information for the agent includes an amount of time for the agent to reach another agent in the environment or a road feature in the environment.

7. The computer-implemented method of claim 1, further comprising:
    applying, by the computing system, a label to an unlabeled encoding of a cluster of parameter-based encodings of the one or more clusters of parameter-based encodings based at least in part on a labeled encoding of the cluster of parameter-based encodings.

8. The computer-implemented method of claim 1, wherein causing control of the operation of the vehicle comprises:
    causing, by the computing system, the vehicle to perform a maneuver based on the determined vehicle behavior.

9. The computer-implemented method of claim 1, further comprising:
    determining, by the computing system, a first sub-cluster of parameter-based encodings and a second sub-cluster of parameter-based encodings from a given cluster associated within a given scenario;
    determining, by the computing system, the first sub-cluster represents a first sub-scenario; or
    determining, by the computing system, the second sub-cluster represents a second sub-scenario.

10. The computer-implemented method of claim 9, further comprising:
    associating, by the computing system, parameter-based encodings included in the first sub-cluster with a first vehicle maneuver to be performed autonomously or semi-autonomously; or
    associating, by the computing system, parameter-based encodings included in the second sub-cluster with a second vehicle maneuver to be performed autonomously or semi-autonomously.

11. A system comprising:
    at least one processor; and
    a memory storing instructions that, when executed by the at least one processor, cause the system to perform:
        accessing a plurality of parameter-based encodings providing a structured representation of an environment captured by one or more sensors associated with a plurality of vehicles traveling through the environment, wherein a given parameter-based encoding identifies one or more agents that were detected by a vehicle of the plurality of vehicles within the environment and at least one of: respective location information, distance information, motion information, or time information for the one or more agents within the environment, and wherein the plurality of parameter-based encodings are clustered into one or more clusters of parameter-based encodings;

determining at least one scenario associated with the environment based at least in part on the one or more clusters of parameter-based encodings;

determining vehicle behavior for the vehicle based at least in part on instances in the one or more clusters of parameter-based encodings where other vehicles of the plurality of vehicles navigated the at least one scenario; and causing control of an operation of the vehicle based on the determined vehicle behavior.

12. The system of claim 11, wherein causing control of the operation of the vehicle includes performing a maneuver based on the instances where the other vehicles navigated the at least one scenario indicating the other vehicles were able to perform the maneuver, or not performing the maneuver based on the instances where the other vehicles navigated the at least one scenario indicating the other vehicles were not able to perform the maneuver.

13. The system of claim 11, wherein the plurality of parameter-based encodings are clustered into the one or more clusters of parameter-based encodings by:

generating respective feature vector representations for each of the plurality of parameter-based encodings; and clustering the feature vector representations based on similarity to determine the one or more clusters of parameter-based encodings.

14. The system of claim 13, wherein a feature vector representation includes two or more features corresponding to location information for the one or more agents, motion information for the one or more agents, distance information for the one or more agents, time information for the one or more agents, or a combination thereof.

15. The system of claim 14, wherein the location information provides a geometric location for an agent with respect to a geometric map of the environment, a semantic location for the agent with respect to a semantic map of the environment, or both.

16. A non-transitory computer-readable storage medium including instructions that, when executed by at least one processor of a computing system, cause the computing system to perform a method comprising:

accessing a plurality of parameter-based encodings providing a structured representation of an environment captured by one or more sensors associated with a plurality of vehicles traveling through the environment, wherein a given parameter-based encoding identifies one or more agents that were detected by a vehicle of the plurality of vehicles within the environment and at least one of: respective location information, distance information, motion information, or time information for the one or more agents within the environment, and wherein the plurality of parameter-based encodings are clustered into one or more clusters of parameter-based encodings;

determining at least one scenario associated with the environment based at least in part on the one or more clusters of parameter-based encodings;

determining vehicle behavior for the vehicle based at least in part on instances in the one or more clusters of parameter-based encodings where other vehicles of the plurality of vehicles navigated the at least one scenario; and causing control of an operation of the vehicle based on the determined vehicle behavior.

17. The non-transitory computer-readable storage medium of claim 16, wherein causing control of the operation of the vehicle includes performing a maneuver based on the instances where the other vehicles navigated the at least one scenario indicating the other vehicles were able to perform the maneuver, or not performing the maneuver based on the instances where the other vehicles navigated the at least one scenario indicating the other vehicles were not able to perform the maneuver.

18. The non-transitory computer-readable storage medium of claim 16, wherein the plurality of parameter-based encodings are clustered into the one or more clusters of parameter-based encodings by:

generating respective feature vector representations for each of the plurality of parameter-based encodings; and clustering the feature vector representations based on similarity to determine the one or more clusters of parameter-based encodings.

19. The non-transitory computer-readable storage medium of claim 18, wherein a feature vector representation includes two or more features corresponding to location information for the one or more agents, motion information for the one or more agents, distance information for the one or more agents, time information for the one or more agents, or a combination thereof.

20. The non-transitory computer-readable storage medium of claim 19, wherein the location information provides a geometric location for an agent with respect to a geometric map of the environment, a semantic location for the agent with respect to a semantic map of the environment, or both.

* * * * *